US008296936B2

(12) United States Patent
Lin

(10) Patent No.: US 8,296,936 B2
(45) Date of Patent: Oct. 30, 2012

(54) PHONE CABLE CRIMPING TOOL

(75) Inventor: Pai-Wei Lin, Tu Cheng (TW)

(73) Assignee: Hanlong Industrial Co., Ltd., Tu Cheng, Taipei Hsien (TW)

( * ) Notice: Subject to any disclaimer, the term of this patent is extended or adjusted under 35 U.S.C. 154(b) by 427 days.

(21) Appl. No.: 12/721,700

(22) Filed: Mar. 11, 2010

(65) Prior Publication Data

US 2011/0126404 A1 Jun. 2, 2011

(30) Foreign Application Priority Data

Nov. 30, 2009 (TW) ............................... 98222408 U

(51) Int. Cl.
*B23P 19/00* (2006.01)
*H01R 43/042* (2006.01)

(52) U.S. Cl. ............. 29/751; 29/278; 29/566.4; 29/750; 29/758

(58) Field of Classification Search .................... 29/751, 29/33 M, 278, 566.4, 750, 758, 861
See application file for complete search history.

(56) References Cited

U.S. PATENT DOCUMENTS 4,241,496 A * 12/1980 Gregson .......................... 29/751
4,656,725 A * 4/1987 Knickerbocker ............ 29/566.4
6,058,600 A * 5/2000 Leu ................................ 29/751
7,096,564 B2 * 8/2006 Sullivan ....................... 29/566.4

* cited by examiner

*Primary Examiner* — Thiem Phan
(74) *Attorney, Agent, or Firm* — Alan Kamrath; Kamrath IP Lawfirm, PA

(57) ABSTRACT

A phone cable crimping tool is disclosed. The phone cable crimping tool comprises a body part, a first crimping head, a second crimping head, and a rotary unit. The body part comprises a first end and a second end; the first crimping head is connected to the first end of the body part; the second crimping head is connected to the second end of the body part; the rotary unit is pivotally connected to the body part, and the rotary unit is located externally to either the first crimping head or the second crimping head through rotary movements.

13 Claims, 7 Drawing Sheets

PHONE CABLE CRIMPING TOOL

BACKGROUND OF THE INVENTION

1. Field of the Invention

The present invention relates to a phone cable crimping tool, and more particularly, to a phone cable crimping tool which comprises two types of crimping head.

2. Description of the Related Art

The traditional phone cable crimping tool usually consists of one crimping head, which can only be applied in crimping a terminal plate of a specific phone cable standard. However, this causes a user inconvenience, for the phone cable crimping tool is required to be changed whenever a cable with a different standard needs to be crimped.

Although there are other phone cable crimping tools which allow for the replacement of the crimping head, the complex structure increases the production cost and cannot be widely accepted by the public.

Therefore, it is necessary to provide a phone crimping tool which consists of a simple structure with two selective tool heads in order to resolve the aforementioned problems.

SUMMARY OF THE INVENTION

The object of the present invention is to provide a phone cable crimping tool that provides two selective crimping heads.

To achieve the above object, the phone cable crimping tool of the present invention comprises a body part, a first crimping head, a second crimping head, and a rotary unit. The body part comprises a first end and a second end; the first crimping head is connected to the first end of the body part; the second crimping head is connected to the second end of the body part; the rotary unit is pivotally connected to the body part; and the rotary unit is located externally to either the first crimping head or the second crimping head through rotary movements.

The present invention is innovative and provides a substantial improvement; therefore, a new patent is filed.

DETAILED DESCRIPTION OF THE PREFERRED EMBODIMENT

The advantages and innovative features of the invention will become more apparent from the following preferred embodiments.

Figure 1:
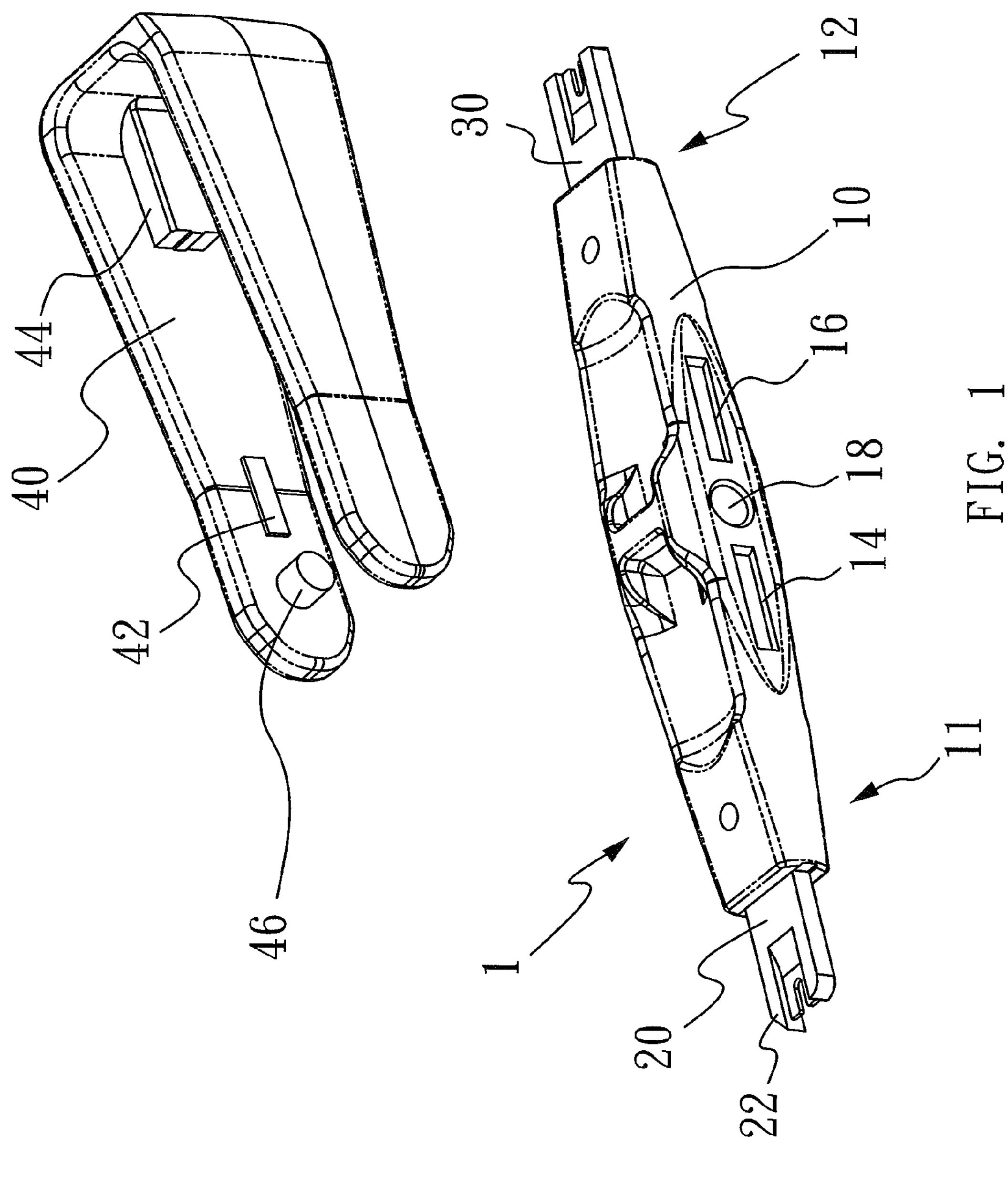
FIG. 1 is a disassembly diagram of the phone cable crimping tool of the first embodiment of the present invention.
Figure 2:
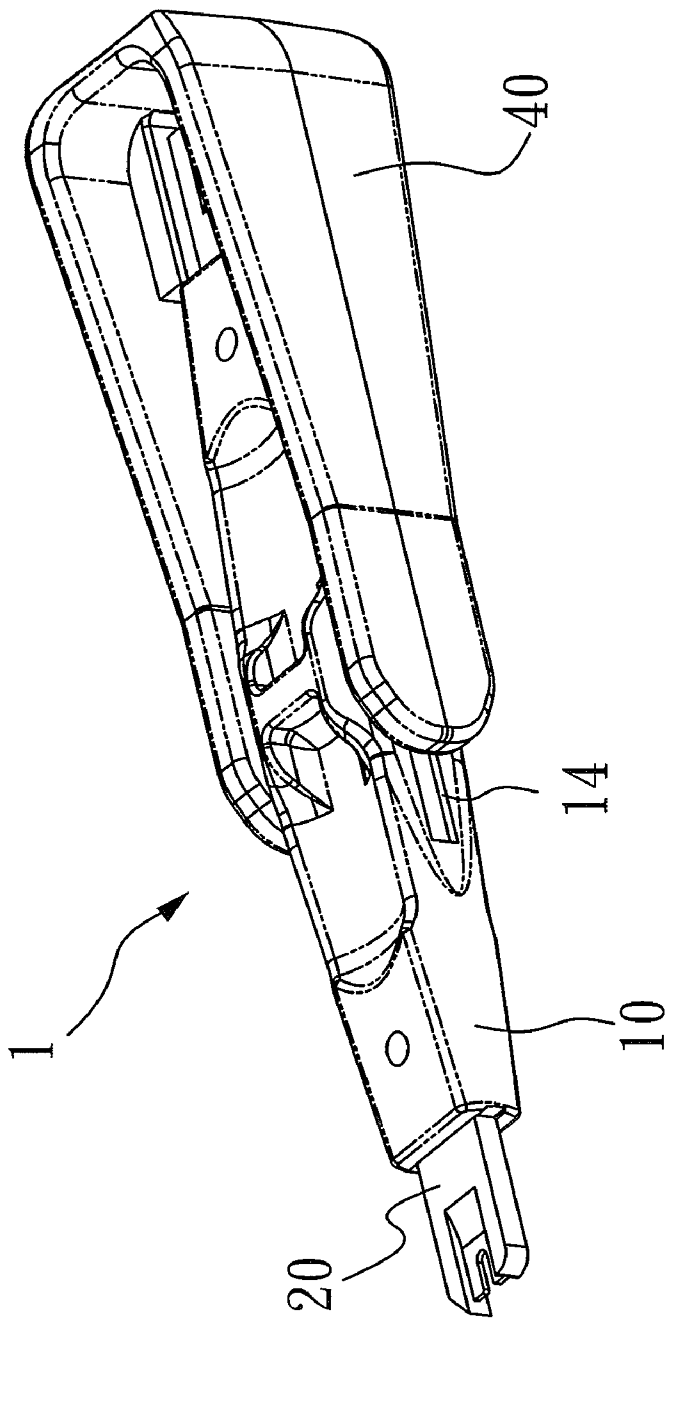
FIG. 2 is a 3D positioning diagram of the phone cable crimping tool of the first embodiment of the present invention.
Figure 3:
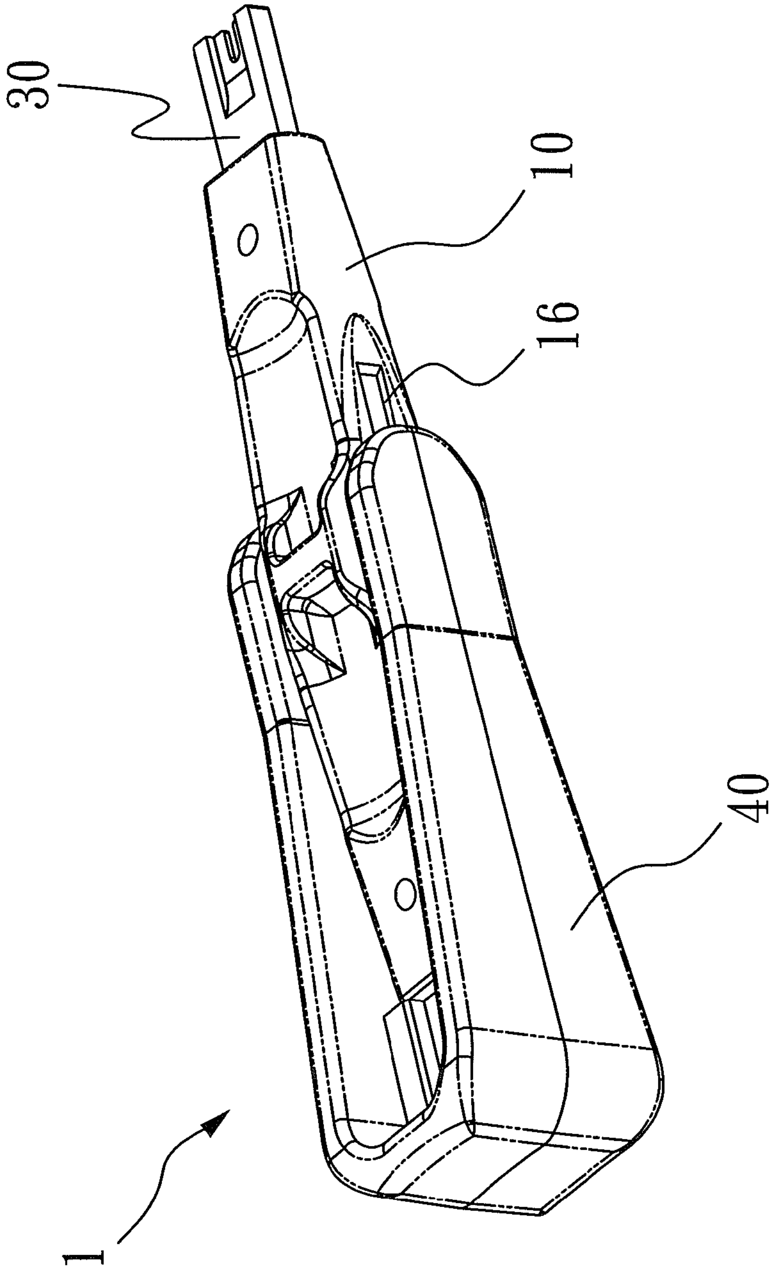
FIG. 3 is another 3D positioning diagram of the phone cable crimping tool of the first embodiment of the present invention.
Figure 4:
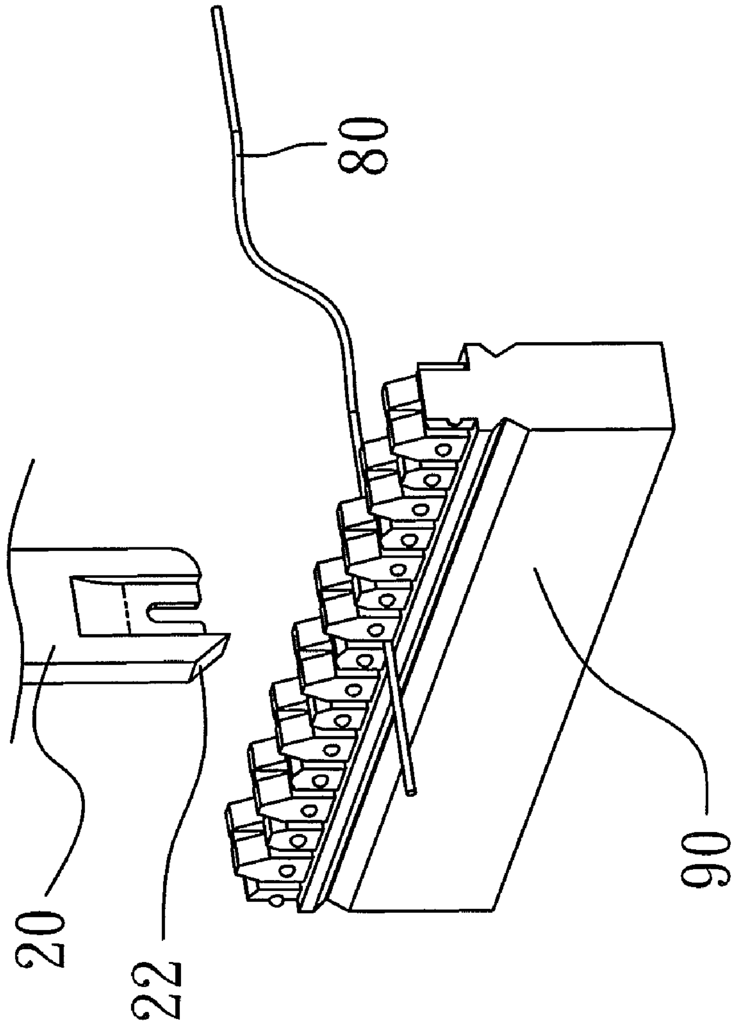
FIG. 4 is the conceptual diagram of the utilization of the phone cable crimping tool of the present invention.

Refer to FIG. 1 to FIG. 4 for the first embodiment of the present invention. FIG. 1 is a disassembly diagram of the phone cable crimping tool of the first embodiment; FIG. 2 is a 3D positioning diagram of the phone cable crimping tool. FIG. 3 is another 3D positioning diagram of the phone cable crimping tool. FIG. 4 is the conceptual diagram of the utilization of the phone cable crimping tool. Phone cable crimping tool 1 comprises a body part 10, a first crimping head 20, a second crimping head 30, and a rotary unit 40.

Body part 10 comprises a first end 11 and a second end 12. In this embodiment, the body part 10 is strip-shaped, and the first end 11 and the second end 12 are located on either side of the body part 10.

The first crimping head 20 is connected to the first end 11 of the body part 10. In this embodiment, the shape of the first crimping head 20 is suitable to be used with the phone terminal plate having a standard 110.

In this embodiment, the first crimping head 20 further comprises a cable cutting unit 22. The cable cutting unit 22 is used for cutting the extra cable (refer to FIG. 4) after the phone cable 80 is crimped by the first crimping head 20. Take note that the first crimping head 20 is not limited to the abovementioned standard or structure.

The second crimping head 30 is connected to the second end 12 of the body part 10. The structure or the standard of the second crimping head 30 is different from that of the first crimping head 20 in order to provide the user with more choices. In this embodiment, the shape of the second crimping head 30 is suitable to be used with a phone terminal plate having a standard 110, but it does not consist of a cable cutting unit 22. Take note that the second crimping head 30 is not limited to the abovementioned standard or structure.

Figure 5:
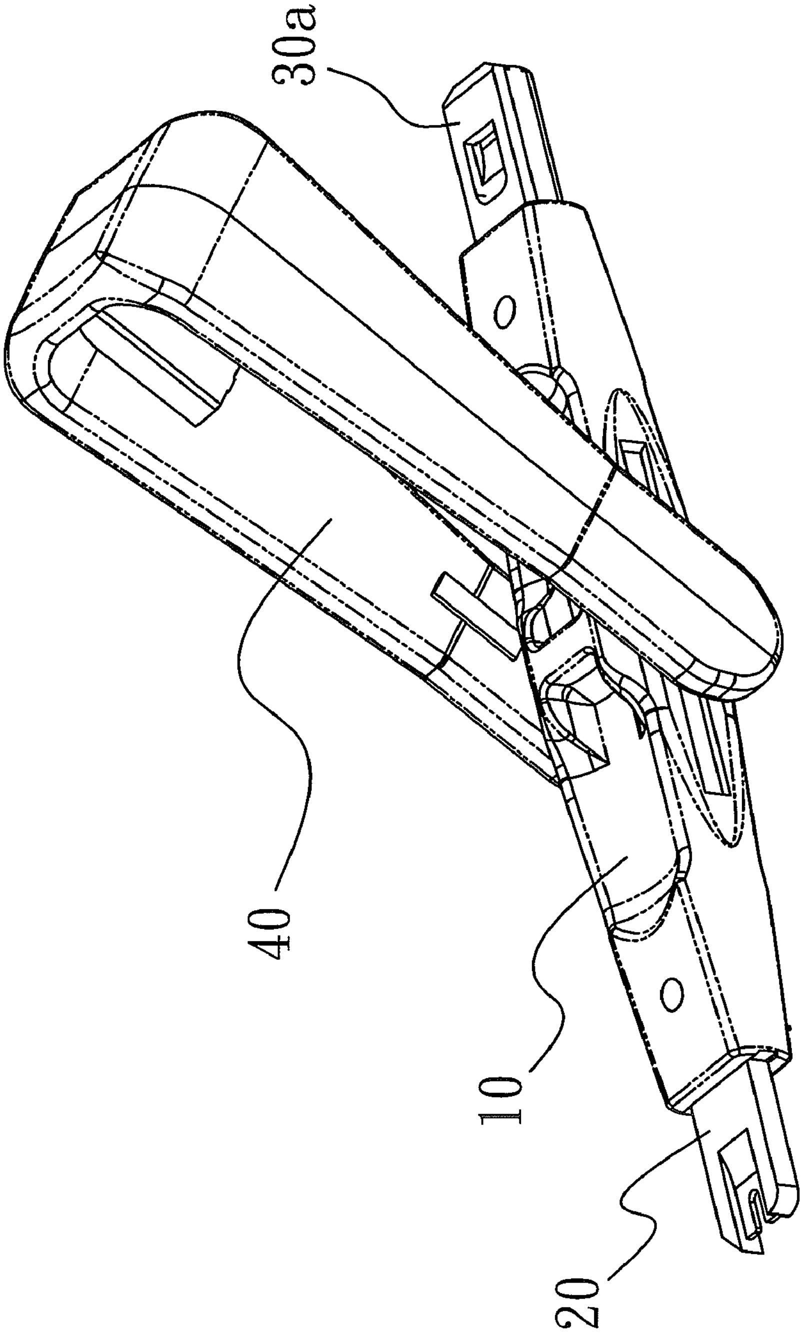
FIG. 5 shows a 3D diagram of a phone cable crimping tool of the present invention having crimping heads of different standards.

For example, refer to FIG. 5, which shows a 3D diagram of a phone cable crimping tool having crimping heads of different standards, wherein the structure of the second crimping head 30*a* is suitable to be used with a phone terminal plate having a standard 66.

The rotary unit 40 is pivotally connected to the body part 10, and the rotary unit 40 is located externally to the first crimping head 20 or to the second crimping head 30 through rotary movements. In this embodiment, the rotary unit 40 is U-shaped, and it can rotate around the body part 10 (as shown in FIG. 2 and FIG. 3). The ends of the rotary unit 40 are pivotally connected to the central position of the body part 10 substantially. In the pivot structure of this embodiment, the rotary unit 40 comprises two protruding parts 46, and the body part 10 comprises two dents 18. The two protruding parts 46 are fitted into the two dents 18 such that the rotary unit 40 is able to rotate around the body part 10. Please note that the pivotal connection of the rotary unit 40 to the body part 10 is not limited to the abovementioned structure.

The rotary unit 40 comprises at least one first clip-fitting part 42; the body part 10 comprises at least one second clip-fitting part 14 and at least one third clip-fitting part 16. The at least one first clip-fitting part can be clip-fitted to the at least one second clip-fitting part 14 or to the at least one third clip-fitting part 16, such that the rotary unit 40 can be fixed externally to the first crimping head 20 or fixed externally to the second crimping head 30. In this embodiment, there are two first clip-fitting parts 42, two second clip-fitting parts 14, and two third clip-fitting parts 16. The first clip-fitting part 42 has a protruding shape; the second clip-fitting part 14 and the third clip-fitting part 16 are both dent-shaped. Please note that the first clip-fitting part 42, the second clip-fitting part 14, and the third clip-fitting part 16 are not limited to the abovementioned structure.

When the first clip-fitting part 42 is clip-fitted with the third clip-fitting part 16, the rotary unit 40 is located externally to the second crimping head 30 (as shown in FIG. 2). Under this configuration, the rotary unit 40 is used as a handle, and the first crimping head 20 can be utilized; when the first clip-fitting part 42 is clip-fitted with the second clip-fitting part 14, the rotary unit 40 is located externally to the first crimping head 20 (as shown in FIG. 3). Under this configuration, the rotary unit 40 is used as a handle and the second crimping head 30 can be utilized.

In this embodiment, the rotary unit 40 further comprises a protective unit 44; the protective unit 44 is used to protect the first crimping head 20 or the second crimping head 30. In other words, when the first clip-fitting part 42 is clip-fitted with the third clip-fitting part 16, the protective unit 44 is located externally to the second crimping head 30 (as shown in FIG. 2); when the first clip-fitting part 42 is clip-fitted with the second clip-fitting part 14, the protective unit 40 is located externally to the first crimping head 20 (as shown in FIG. 3). The protective unit 44 is able to protect the crimping head and keep it free of dust.

Figure 6:
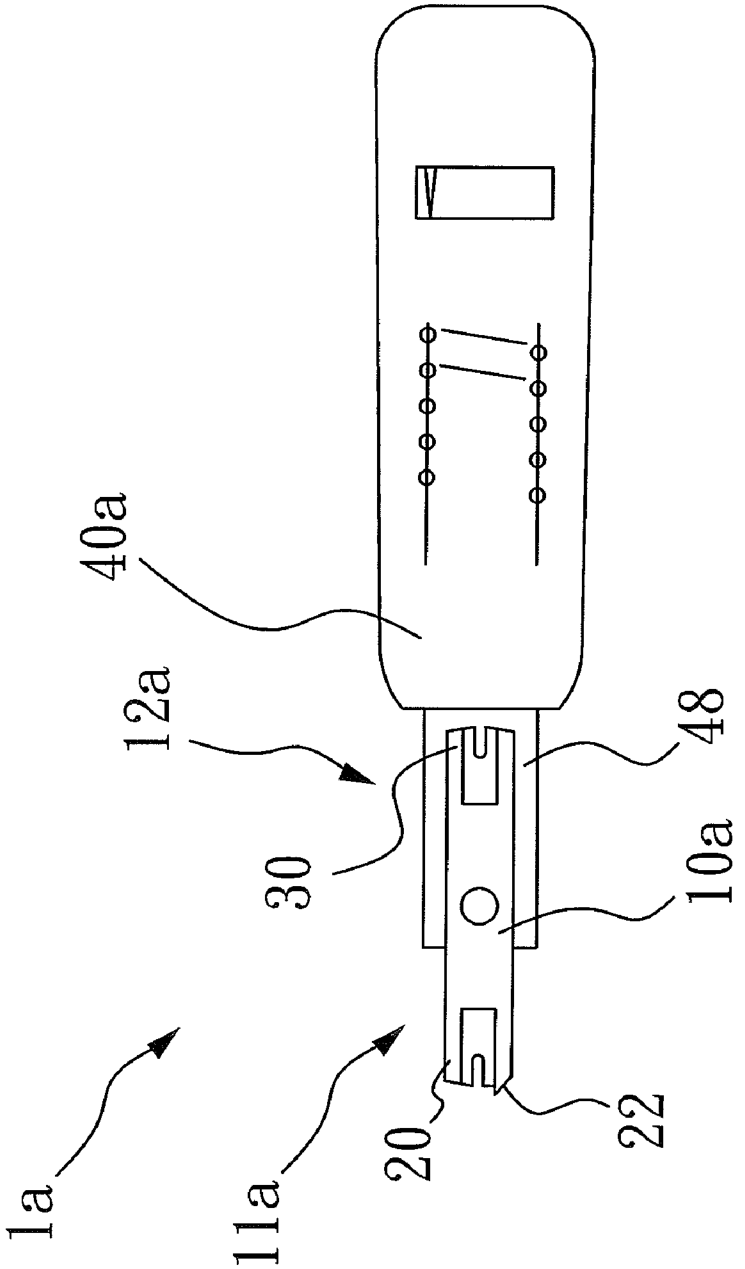
FIG. 6 shows the positioning diagram of the phone cable crimping tool of the second embodiment of the present invention.
Figure 7:
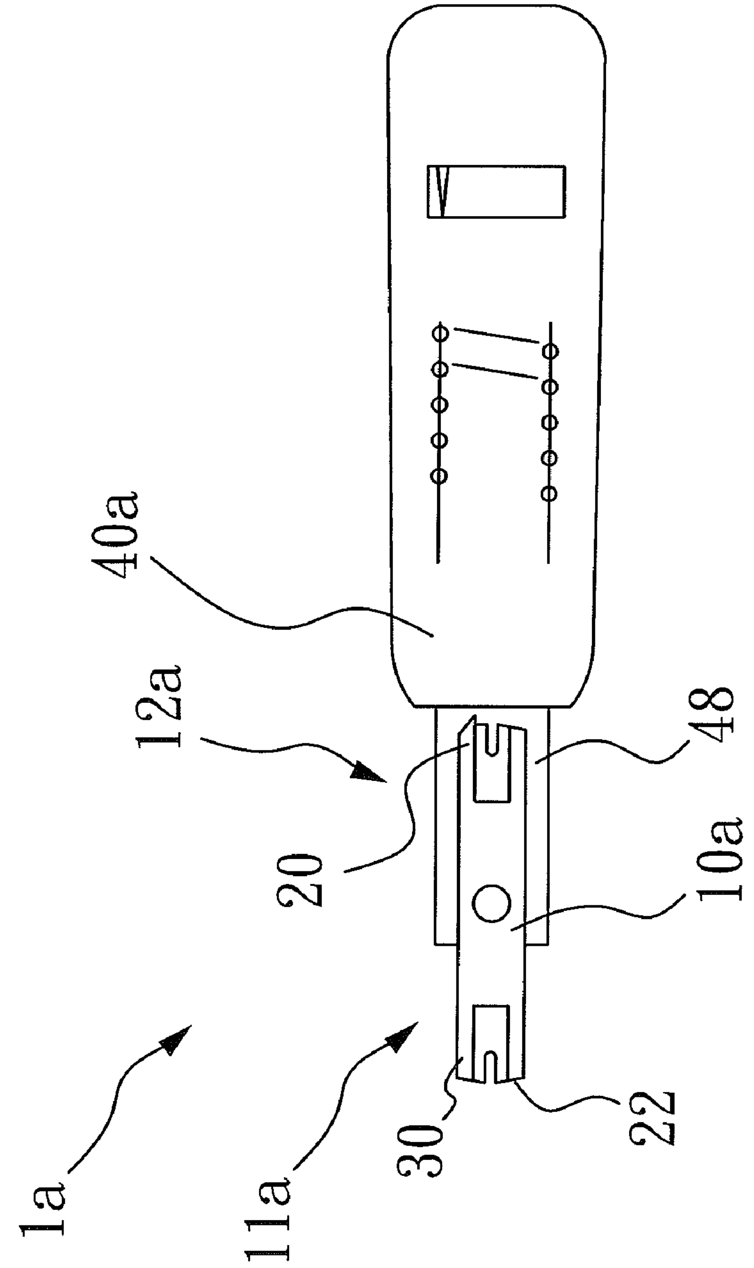
FIG. 7 shows another positioning diagram of the phone cable crimping tool of the second embodiment of the present invention.

Next, refer to FIG. 6 and FIG. 7 for the second embodiment of the phone cable crimping tool of the present invention. FIG. 6 shows the positioning diagram of the phone cable crimping tool of the present invention. FIG. 7 shows another positioning diagram of the phone cable crimping tool of the present invention.

The phone cable crimping tool 1 a comprises a body part 10*a*, a first crimping head 20, a second crimping head 30, and a rotary unit 40*a*. In this embodiment, the rotary unit 40*a* is strip-shaped, and one end of the rotary unit 40*a* is pivotally connected to the central position of the body part 10*a* substantially. One end of the rotary unit 40*a*, which is close to the body part 10*a*, consists of a concave part 48. The concave part 48 can accommodate the first crimping head 20 or the second crimping head 30.

When the second crimping head 30 is located in the concave part 48 (as shown in FIG. 6), the rotary unit 40*a* is used as a handle and the first crimping head 20 is ready to be used; when the first crimping head 20 is located in the concave part 48 (as shown in FIG. 7), the rotary unit 40*a* is used as a handle and the second crimping head 30 is ready to be used.

In this embodiment, the rotary unit 40*a* further comprises an internal elastic-impact mechanism (not shown), whereby the phone cable crimping tool la is able to crimp the phone cable 80 with a specific crimping force. This prevents the application of excessive or insufficient force during the crimping process, and it enhances the operating convenience of the phone cable crimping tool 1*a*.

Although the present invention has been explained in relation to its preferred embodiments, it is also of vital importance to acknowledge that many other possible modifications and variations can be made without departing from the spirit and scope of the invention as hereinafter claimed.

What is claimed is:

1. A phone cable crimping tool comprising:

a body part, the body part comprising a first end and a second end;

a first crimping head, the first crimping head being connected to the first end of the body part;

a second crimping head, the second crimping head being connected to the second end of the body part; and a rotary unit, the rotary unit being pivotally connected to the body part, and the rotary unit being located externally to either the first crimping head or the second crimping head through rotary movements.

2. The phone cable crimping tool as claimed in claim 1, wherein the rotary unit comprises at least one first clip-fitting part; the body part comprises at least one second clip-fitting part and at least one third clip-fitting part; the at least one first clip-fitting part can be clip-fitted to the at least one second clip-fitting part or to the at least one third clip-fitting part, such that the rotary unit can be clip-fixed externally to the first crimping head or clip-fixed externally to the second crimping head.

3. The phone cable crimping tool as claimed in claim 1, wherein the first crimping head further comprises a cable cutting unit.

4. The phone cable crimping tool as claimed in claim 1, wherein the rotary unit is U-shaped.

5. The phone cable crimping tool as claimed in claim 4, wherein the ends of the rotary unit are pivotally connected to the substantial central position of the body part.

6. The phone cable crimping tool as claimed in claim 5, wherein the body part is strip-shaped.

7. The phone cable crimping tool as claimed in claim 5, wherein the rotary unit comprises two protruding parts, and the body part comprises two dents, the two protruding parts fitting into the two dents such that the rotary unit is pivotally connected to the body part.

8. The phone cable crimping tool as claimed in claim 1, wherein the rotary unit further comprises a protective unit, the protective unit being used to protect the first crimping head or the second crimping head.

9. The phone cable crimping tool as claimed in claim 1, wherein the rotary unit is strip-shaped.

10. The phone cable crimping tool as claimed in claim 9, wherein one end of the rotary unit is pivotally connected to the substantial central position of the body part.

11. The phone cable crimping tool as claimed in claim 10, wherein the rotary unit further comprises a concave part, and the concave part can accommodate the first crimping head or the second crimping head.

12. The phone cable crimping tool as claimed in claim 10, wherein the rotary unit further comprises an internal elastic-impact mechanism.

13. The phone cable crimping tool as claimed in claim 1, wherein the shape of the first crimping head is suitable to be used with a phone terminal plate having a standard 110 or standard 66.

* * * * *